(12) United States Patent
Popadiuc et al.

(10) Patent No.: US 9,546,609 B2
(45) Date of Patent: Jan. 17, 2017

(54) INTEGRATED GAS NOZZLE CHECK VALVE AND ENGINE USING SAME

(71) Applicant: Electro-Motive Diesel, Inc., LaGrange, IL (US)

(72) Inventors: Ovidiu Petru Popadiuc, Bensenville, IL (US); Nicholas Denman Norris, Chicago, IL (US)

(73) Assignee: Electro-Motive Diesel, Inc., La Grange, IL (US)

(*) Notice: Subject to any disclaimer, the term of this patent is extended or adjusted under 35 U.S.C. 154(b) by 140 days.

(21) Appl. No.: 14/314,326

(22) Filed: Jun. 25, 2014

(65) Prior Publication Data

US 2015/0377184 A1 Dec. 31, 2015

(51) Int. Cl.

| | |
|---|---|
| *F02B 3/00* | (2006.01) |
| *F02D 19/06* | (2006.01) |
| *F02D 9/10* | (2006.01) |
| *F02M 21/02* | (2006.01) |
| *F02D 41/30* | (2006.01) |
| *F02D 41/40* | (2006.01) |
| *F02B 3/06* | (2006.01) |
| *F02B 1/12* | (2006.01) |

(52) U.S. Cl.
CPC ......... *F02D 19/0681* (2013.01); *F02D 9/1025* (2013.01); *F02M 21/023* (2013.01); *F02B 1/12* (2013.01); *F02B 3/06* (2013.01); *F02D 41/3035* (2013.01); *F02D 41/402* (2013.01); *F02D 41/403* (2013.01); *Y02T 10/36* (2013.01)

(58) Field of Classification Search
CPC .. F02D 41/402; F02D 41/403; F02D 41/3035; F02B 3/06; F02B 1/12

USPC ......................................................... 123/299
See application file for complete search history.

(56) References Cited

U.S. PATENT DOCUMENTS

| | | | |
|---|---|---|---|
| 4,462,346 A | 7/1984 | Haman et al. | |
| 4,625,688 A * | 12/1986 | Takayasu | F02B 33/04 123/73 B |
| 4,679,538 A | 7/1987 | Foster | |
| 4,702,215 A | 10/1987 | Lebald | |
| 5,613,468 A * | 3/1997 | Ibara | F02B 25/14 123/184.54 |
| 5,673,671 A * | 10/1997 | Kato | F02B 31/06 123/308 |
| 5,740,782 A | 4/1998 | Lowi, Jr. | |

(Continued)

FOREIGN PATENT DOCUMENTS

| | | | |
|---|---|---|---|
| JP | 2003035010 A * | 2/2003 | |
| JP | 2006-077661 A | 3/2006 | |
| JP | 2009108826 A | 5/2009 | |

*Primary Examiner* — Lindsay Low
*Assistant Examiner* — Charles Brauch

(57) ABSTRACT

A gas supply nozzle assembly for port injection of gaseous fuel into a cylinder of an engine includes a main body with a funnel shape that has a large area inlet for attachment to a metering valve and a small end. A centerline of the main body curves through an angle greater than zero. An end nozzle that defines a gas passage extending between an inlet and a discharge end. A check valve is clamped between the small end of the main body and the inlet end of the end nozzle, and is biased closed to block flow from the end nozzle into the main body, the opening responsive to a pressure differential to permit flow from the main body into the end nozzle.

18 Claims, 3 Drawing Sheets

(56) References Cited

U.S. PATENT DOCUMENTS

| | | | |
|---|---|---|---|
| 6,162,354 A * | 12/2000 | Yang | B01D 29/117 |
| | | | 210/136 |
| 6,250,260 B1 | 6/2001 | Green | |
| 6,453,940 B1 | 9/2002 | Tipton et al. | |
| 6,536,386 B2 | 3/2003 | Asai et al. | |
| 7,913,673 B2 * | 3/2011 | Vanderslice | F02D 19/0631 |
| | | | 123/27 GE |
| 2003/0089404 A1 * | 5/2003 | Bodnar | F16K 15/035 |
| | | | 137/512.1 |
| 2004/0250797 A1 | 12/2004 | Shetley | |
| 2008/0022983 A1 * | 1/2008 | Martindale | F02D 19/081 |
| | | | 123/575 |
| 2013/0081593 A1 | 4/2013 | Coldren | |

* cited by examiner

INTEGRATED GAS NOZZLE CHECK VALVE AND ENGINE USING SAME

TECHNICAL FIELD

The present disclosure relates generally to gas supply nozzle assemblies, and more particularly to the inclusion of a check valve in a nozzle assembly for a dual fuel engine.

BACKGROUND

With the growing abundance of natural gas, there has been a tendency in the engine industry to modify existing diesel engines or create new dual fuel engines with the capability of burning both natural gas and distillate diesel fuel. When operating in a dual fuel mode, a gaseous fuel charge is supplied to the engine cylinder by moving gaseous fuel through a metering valve and a gas supply nozzle into the engine cylinder. The gaseous fuel charge may then be ignited by compression igniting diesel fuel directly injected into the injection cylinder. When operating in a single fuel mode, the engine operates with only diesel fuel. Especially when the engine is operating in a diesel fuel mode, there may be a risk of back flow of gases and contaminants from the engine cylinder back toward the gas metering valve. These issues may be further exacerbated in the case of dual fuel two stroke engines of the type sometimes utilized in the locomotive industry.

The present disclosure is directed toward one or more of the problems set forth above.

SUMMARY

In one aspect, an internal combustion engine includes a housing that defines at least one cylinder. A piston is positioned to reciprocate in the cylinder. A gaseous fuel supply system includes a metering valve fluidly positioned between a source of gaseous fuel and a gas supply nozzle assembly, which includes an outlet that opens into the cylinder. A liquid fuel supply system includes a source of liquid fuel fluidly connected to a fuel injector with a spray tip positioned in the cylinder. The gas supply nozzle assembly includes a check valve attached between a main body, which is attached to the metering valve, and an end nozzle fluidly connected to the cylinder. The check valve is movable between an open position to permit flow of gaseous fuel into the cylinder, and a closed position to prevent fluid flow from the cylinder into the main body.

In another aspect, a nozzle assembly for port injection of gaseous fuel into a cylinder of an engine includes a main body with a funnel shape that has a large area inlet for attachment to a gas metering valve and a small end. A main body has a centerline that curves through an angle greater than zero. An end nozzle defines a gas passage extending between an inlet and a discharge end. A check valve is clamped between the small end of the main body and the inlet end of the end nozzle, and is biased closed to block flow from the end nozzle into the main body, but opening responsive to a pressure differential to permit flow from the main body into the end nozzle.

In another aspect, a method of operating the engine includes supplying gaseous fuel to a cylinder by opening a metering valve and a check valve. The supply of gaseous fuel is ended by closing the metering valve. Reverse flow of fluid from the cylinder into the main body of a nozzle assembly is prevented by closing the check valve.

DETAILED DESCRIPTION

Figure 1:
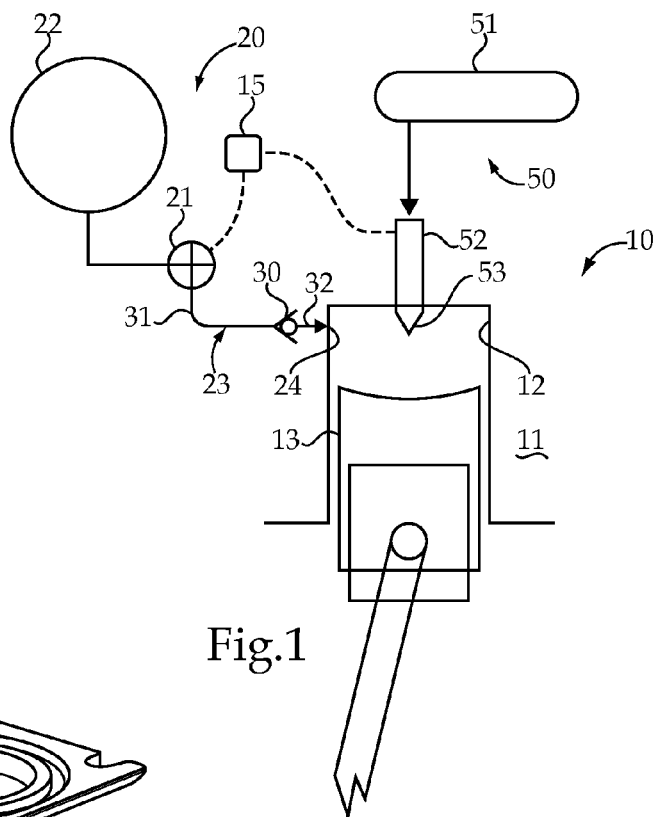
FIG. 1 is a schematic view of an engine according to the present disclosure.

Referring initially to FIG. 1, an internal combustion engine 10 includes a housing 11 that defines at least one cylinder 12. A piston 13 is positioned to reciprocate in cylinder 12 between a bottom dead center position and a top dead center position. A gaseous fuel supply system 20 includes a metering valve 21 fluidly positioned between a source of gaseous fuel 22 and a gas supply nozzle assembly 23, which includes an outlet 24 that opens into the cylinder 12. A liquid fuel supply system 50 includes a source of liquid fuel 51 fluidly connected to a fuel injector 52 with a spray tip 53 positioned in the cylinder 12. The gas supply nozzle assembly 23 includes a check valve 30 attached between a main body 31, which is attached to metering valve 21, and an end nozzle 32 fluidly connected to the cylinder 12. The check valve is movable between an open position to permit flow of gaseous fuel into cylinder 12, and a closed position to prevent fluid flow from the cylinder 12 into the main body 31. Both fuel injector 52 and metering valve 21 may be controlled in their operation by an electronic controller 15 in a conventional manner.

Figure 2:
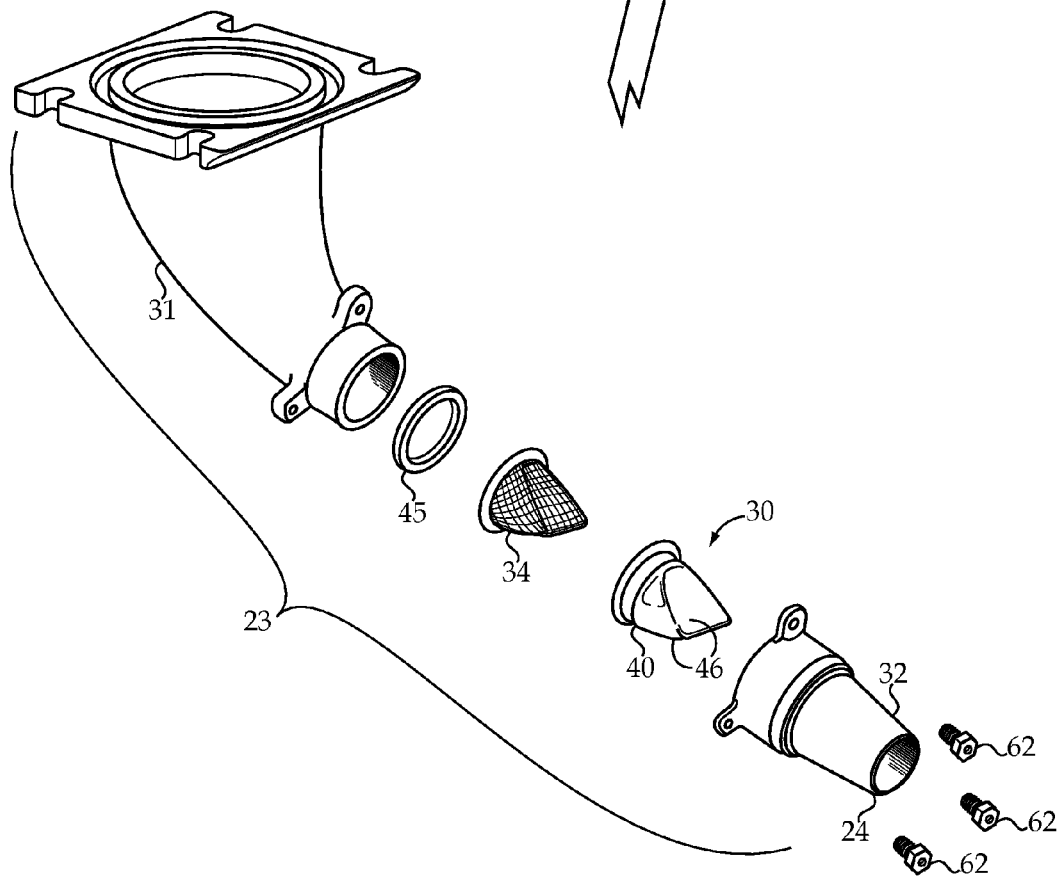
FIG. 2 is an exploded view of a gas supply nozzle assembly for the engine of FIG. 1.
Figure 3:
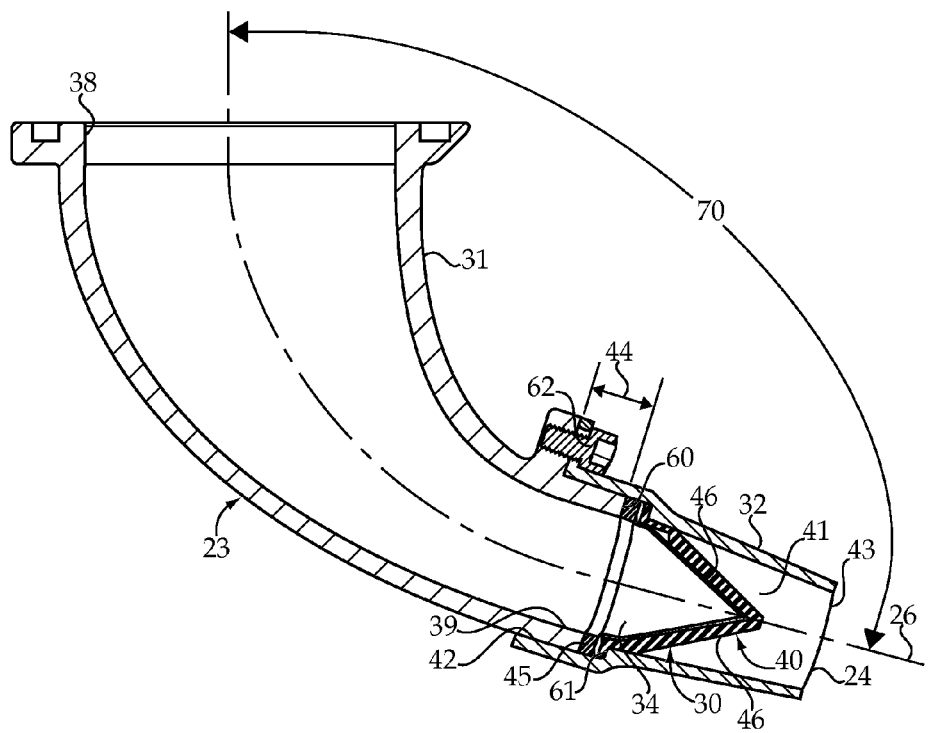
FIG. 3 is a sectioned side view of the gas supply nozzle assembly of FIG. 2.

Referring now in addition to FIGS. 2 and 3, the gas supply nozzle assembly 23 for the engine 10 of FIG. 1 is shown in greater detail. In particular, main body 31 may include a funnel shape that has a large area inlet 38 for attachment to gas metering valve 21, and a small end 39. The main body 31 has a centerline 26 that curves through an angle 70 greater than zero. The end nozzle 32 defines a gas passage 41 extending between an inlet end 42 and a discharge end 43. The check valve 30 is clamped between the small end 39 of main body 31 and the inlet end 42 of the end nozzle 32. Check valve 30 is biased closed to block flow from the end nozzle 32 into the main body 31. The check valve 30 opens responsive to a pressure differential to permit flow from the main body 31 into the end nozzle 32, such as when gaseous fuel is being supplied to cylinder 12. Although not necessary, a segment 44 of main body 31 may be received in end nozzle 32, with the check valve 30 positioned entirely inside the end nozzle 32, as best shown in FIG. 3. The main body 31 may terminate at an annular seat 60 and the end nozzle 32 may define an annular shoulder 61. The check valve 30 may be clamped between the annular seat 60 and the annular shoulder 61 with a plurality of bolts 62. The gas supply nozzle assembly 23 may include a compression adjustment washer 45 clamped in contact with the check valve 30 and one of the main body 31 (shown) and the end nozzle 32.

Figure 4:
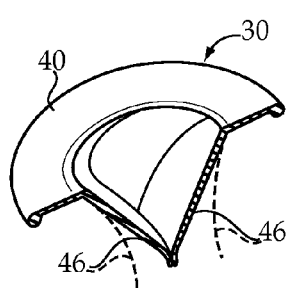
FIG. 4 is a perspective sectioned view of the check valve from the gas supply nozzle assembly of FIG. 3.

Referring in addition to FIG. 4, the check valve 30 illustrated with the gas supply nozzle assembly 23 of FIGS. 2 and 3 may take the form of a deformable body 40 with flaps 46 that contact each other and a strainer seat 34 in the closed position, and be formed out of contact with the strainer seat 34 at the open position. Strainer seat 34 may be a relatively stiff wire mesh construction having a shape that supports deformable body 40 in the closed position so that high pressure originating in cylinder 12 cannot cause the deformable body 40 to invert in an undesirable manner. In particular, check valve 30 may include exactly two flaps 46 that form a so called "duck bill" configuration. In the embodiment shown, the two flaps 46 contact each other in the closed position at centerline 26 as best shown in FIG. 3.

Figure 5:
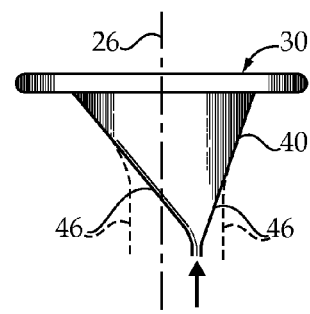
FIG. 5 is a side view of an alternative asymmetric check valve according to another aspect of the present disclosure.
Figure 6:
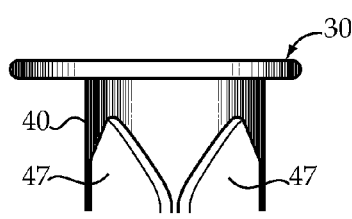
FIG. 6 is a side view of a cross slit version of a check valve according to another aspect of the present disclosure.
Figure 7:
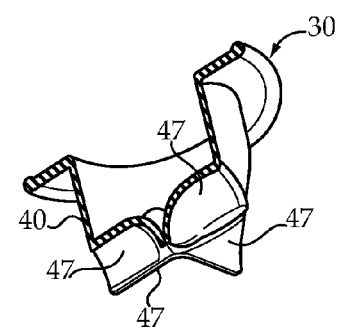
FIG. 7 is a perspective sectioned view of the check valve of FIG. 6.
Figure 8:
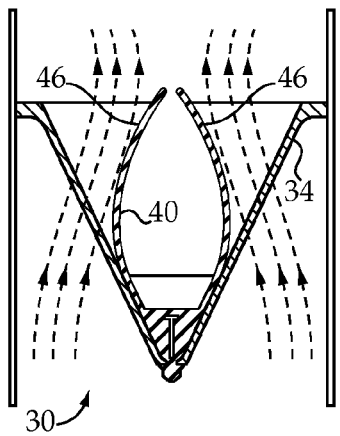
FIG. 8 is a sectioned side view of still another alternative check valve according to the present disclosure in an open position.
Figure 9:
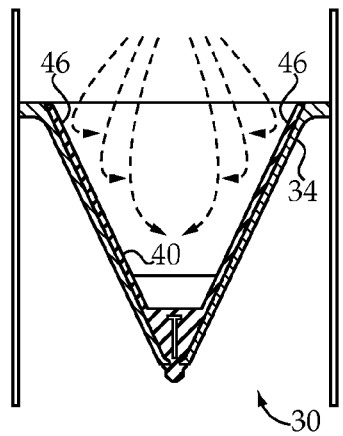
FIG. 9 is a sectioned side view of the check valve of FIG. 8 and its closed position.
Figure 10:
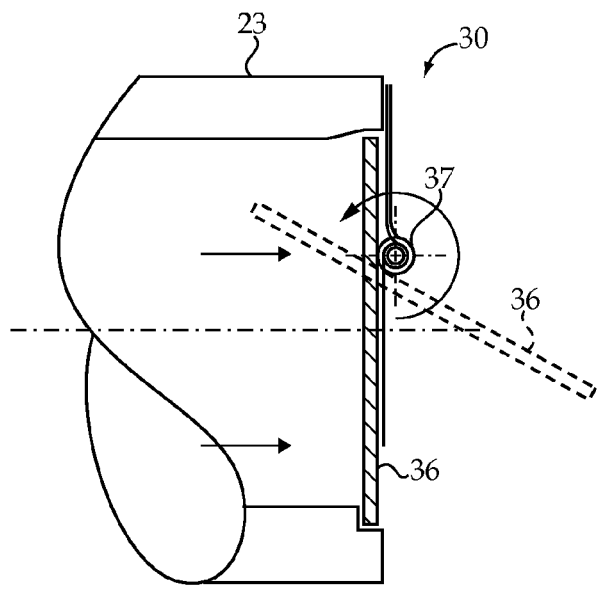
FIG. 10 is a sectioned side view of a butterfly type check valve according to another aspect of the present disclosure.
Figure 11:
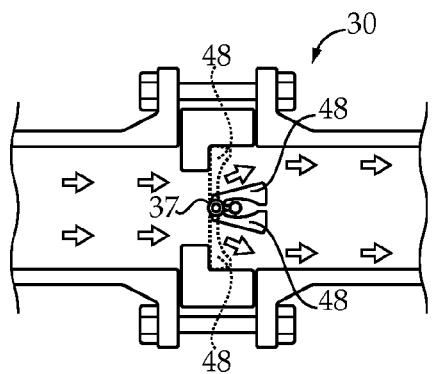
FIG. 11 is a sectioned side view of a split disk check valve according to another aspect of the present disclosure.

The present disclosure also contemplates other check valves 30 that include a deformable body 40. For instance, FIG. 5 shows an alternative embodiment in which the deformable body 40 still includes exactly two flaps 46, but the configuration is asymmetrical such that the two flaps meet in a slit that is offset from centerline 26 through the gas supply nozzle assembly 23. FIGS. 6 and 7 shows still another embodiment of check valve 30 in which the deformable body 40 includes a exactly four flaps 47 that close in a cross slit configuration. Those skilled in the art will appreciate that the embodiment shown in FIGS. 6 and 7 could have the cross slit centered on the centerline 26 of the gas supply nozzle assembly, but asymmetrical configurations of the cross slit configuration check valve 30 would also fall within the scope of the present disclosure. Those skilled in the art will appreciate that the deformable body 40 should be made from a material that can withstand the hostile environment of heat and chemistry that exists adjacent the engine cylinders 12. Check valves 30 that include a deformable body 40 may be available from Parker Hannifin. The check valve 30 of FIGS. 8 and 9 is similar to the embodiment of FIGS. 2-4 except that the position of the strainer seat 34 and the deformable body 40 are rotated one hundred and eighty degrees(180°). In FIGS. 2-4 the strainer seat 34 tapers in shape in the downstream direction. In FIGS. 8 and 9, the strainer seat 34 tapers in shape in the upstream direction. Similarly, in FIGS. 2 and 3, when the flaps 46 of the deformable body are closed, the deformable body tapers in shape in the downstream direction. In FIGS. 8 and 9, the deformable body 40 with flaps 46 closed tapers in shape in the upstream direction. Those skilled in the art will appreciate that the deformable body 40 would likely be made from a non-metallic material that deforms elastically toward the open position but is biased to its closed position, which may represent the undeformed shape of deformable body 40. FIG. 10 shows another example check valve 30 that would fall within the scope of the present disclosure. In particular, in this version, check valve 30 includes a valve body (main body 23) connected to a valve member 36 by a spring biased hinge 37. FIG. 11 shows a so called split disk check valve 30 that includes a first valve member 48 and a second valve member 48 that are both connected to a spring biased hinge 37. Those skilled in the art will appreciate that a wide variety of other valve constructions could also fall within the scope of the present disclosure.

Some considerations in choosing an appropriate material and structure for a check valve 30 according to the present disclosure are the valves continuing ability to prevent induction air leaks into the main body 31 that might create a combustible mixture that could undesirably detonate. Preferably, the check valve 30 is biased closed, but can open quickly with a minimum of a pressure differential and a very small pressure drop penalty. Electro-active elastomers may be a good choice for construction of the deformable bodies 40 according to the present disclosure. Preferably, the flow area through check valve 30, when in an open position, is greater than a flow area through the end nozzle 32 so that the check valve 30 does not create a flow restriction in the gas supply nozzle assembly 23.

INDUSTRIAL APPLICABILITY

The present disclosure relates generally to gas supply nozzle assemblies used for injection of gaseous fuel into internal combustion engines, including dual fuel engines that also include the ability to burn liquid fuel, such as diesel. The present disclosure finds specific application in two stroke or four stroke dual fuel engines with the ability to primarily burn natural gas that is ignited by compression igniting diesel fuel, or operate in a pure diesel fuel mode in which a check valve in the gas supply nozzle assembly protects the gas metering valve 21.

Referring again to FIG. 1, a method of operating internal combustion engine 10 includes supplying gaseous fuel to cylinder 12 by opening metering valve 21 and check valve 30. The supply of gaseous fuel is ended by closing the metering valve 21. Reverse flow of fluid from cylinder 12 into the main body 31 of the gas supply nozzle assembly 23 is prevented by closing check valve 30. In the case of a two stroke engine 10, the step of supplying gaseous fuel to the cylinder 12 is performed each time the piston reciprocates from top dead center to bottom dead center to back to top dead center. The gaseous fuel in the cylinder 12 may be ignited by compression igniting diesel fuel injected into the cylinder 12 from a fuel injector 52 in a conventional manner. Engine 10 may also operate in a pure diesel mode in which the check valve 30 and the metering valve 21 are kept closed.

The gas supply nozzle assembly 23 of the present disclosure is designed such that it is a two piece assembly to allow for proper installation and seating of the check valve 30, the strainer seat 34 and the compression adjustment washer 45, which may be adjusted with bolts 62 to place a desired compression on the check valve 30. The function of the end nozzle 32 is to direct the flow from the gas metering valve 21, through the check valve 30 and into the cylinder 12. In doing so, it also reduces the flow area to match that of the check valve 30. The gas then flows through the end nozzle 32, which is bolted onto the main body 31. The end nozzle 32 reduces the flow area of the gas even further in order for it to fit into the cylinder 12 air port to deliver gas into cylinder 12. The two piece design (main body 31 and end nozzle 32) may also allow for easy serviceability of the check valve 30 in the event that it needs to be replaced. This structure also allows for different shaped end nozzles 32 to be bolted to main body 31 to provide better gas flow into cylinder 12.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An internal combustion engine comprising:
   a housing that defines at least one cylinder, the cylinder including an air port;
   an intake air system to supply intake air to the cylinder through the air port;
   a piston positioned to reciprocate in the cylinder;
   a gaseous fuel supply system that includes a metering valve fluidly positioned between a source of gaseous fuel and a gas supply nozzle assembly, which includes an outlet that opens and provides gaseous fuel directly into the cylinder, the gaseous fuel supply system different from the intake air system;
   a liquid fuel supply system that includes a source of liquid fuel fluidly connected to a fuel injector with a spray tip positioned in the cylinder;
   the gas supply nozzle assembly including a check valve attached between a main body attached to the metering valve and an end nozzle fluidly connected to the cylinder at the cylinder air port; and
   the check valve being movable between an open position to permit flow of gaseous fuel into the cylinder, and a closed position to prevent fluid flow from the cylinder into the main body; and
   wherein the engine includes a dual fuel configuration in which the metering valve and the check valve open to inject gaseous fuel into the cylinder each time the piston reciprocates in a cycle from top dead center to bottom dead center and back to top dead center; and
   wherein the engine includes a single fuel configuration in which the fuel injector sprays liquid fuel into the cylinder from the spray tip at least once during the cycle, and the check valve remains closed for the cycle.

2. The engine of claim 1 wherein the check valve is biased toward the closed position.

3. The engine of claim 1 wherein a flow area through the check valve is greater than a flow area through the end nozzle.

4. The engine of claim 1 wherein the check valve includes a deformable material with flaps that contact a strainer seat in the closed position, and deform out of contact with the strainer seat at the open position.

5. The engine of claim 1 wherein the check valve includes a valve body connected to a valve member by a spring biased hinge.

6. The engine of claim 1, wherein:
   the main body includes a funnel shape having a large area inlet for attachment to the gas metering valve and a small end, the main body having a centerline that curves through an angle greater than zero;
   the end nozzle defines a gas passage extending between an inlet end and a discharge end;
   the check valve is clamped between the small end of the main body and the inlet end of the end nozzle, and is biased closed to block flow from the end nozzle into the main body, but opens responsive to a pressure differential to permit flow from the main body into the end nozzle.

7. The engine of claim 1 wherein a segment of the main body is received in the end nozzle; and
   the check valve is positioned entirely inside the end nozzle.

8. The engine of claim 1 including a compression adjustment washer clamped in contact with the check valve and one of the main body and the end nozzle.

9. The engine of claim 1 wherein the check valve includes a deformable material with flaps that contact a strainer seat in the closed position, and deform out of contact with the strainer seat at the open position.

10. The engine of claim 9 wherein the check valve includes exactly two flaps.

11. The engine of claim 10 wherein the check valve is asymmetrical in which the two flaps meet at a slit offset from a centerline through the nozzle assembly.

12. The engine of claim 9 wherein the deformable material has four flaps that close in a cross slit configuration.

13. The engine of claim 12 wherein the cross slit is offset from a centerline through the nozzle assembly.

14. The engine of claim 1 wherein the check valve includes a valve body connected to a valve member by a spring biased hinge.

15. The engine of claim 14 wherein the valve member is a first valve member; and the check valve further includes a second valve member connected to the spring biased hinge.

16. The engine of claim 1 wherein the main body terminates at an annular seat;
   the end nozzle defines an annular shoulder;
   the check valve is clamped between the annular seat and the annular shoulder with a plurality of bolts.

17. A method of operating an internal combustion engine that includes a housing that defines at least one cylinder, the cylinder including an air port; an intake air system to supply intake air to the cylinder through the air port; a piston positioned to reciprocate in the cylinder; a gaseous fuel supply system that includes a metering valve fluidly positioned between a source of gaseous fuel and a gas supply nozzle assembly, which includes an outlet that opens directly into the cylinder; a liquid fuel supply system that includes a source of liquid fuel fluidly connected to a fuel injector with a spray tip positioned in the cylinder; the gas supply nozzle assembly including a check valve attached between a main body attached to the metering valve and an end nozzle fluidly connected to the cylinder; and the check valve being movable between an open position to permit flow of gaseous fuel into the cylinder, and a closed position to prevent fluid flow from the cylinder into the main body, and the method comprising the steps of:
   operating the engine in a dual fuel mode including:
      supplying gaseous fuel to the cylinder through the end nozzle directly into the air port by opening the metering valve and the check valve each time the piston reciprocates in a cycle from top dead center to bottom dead center and back to top dead center;
      supplying intake air to the cylinder through the air port, separately from the gaseous fuel;
      ending the supplying gaseous fuel step by closing the metering valve; and
      preventing reverse flow of fluid from the cylinder into the main body of the nozzle assembly by closing the check valve; and
   operating the engine in a single fuel mode including spraying liquid fuel into the cylinder with the spray tip of the fuel injector at least once during the cycle, closing the check valve for the cycle, and supplying intake air to the cylinder through the air port.

18. The method of claim 17 wherein
   operating the engine in the dual fuel mode includes igniting the gaseous fuel in the cylinder by compression igniting diesel fuel injected into the cylinder from the liquid fuel injector.

* * * * *